United States Patent
Sugahara

(10) Patent No.: US 8,838,170 B2
(45) Date of Patent: Sep. 16, 2014

(54) MOBILE APPARATUS

(75) Inventor: Hiroto Sugahara, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 942 days.

(21) Appl. No.: 12/606,741

(22) Filed: Oct. 27, 2009

(65) Prior Publication Data

US 2010/0105432 A1    Apr. 29, 2010

(30) Foreign Application Priority Data

Oct. 27, 2008   (JP) .................. 2008-275253

(51) Int. Cl.
  *H04M 1/00*   (2006.01)
  *G06F 3/01*   (2006.01)
  *G06F 1/16*   (2006.01)

(52) U.S. Cl.
  CPC .............. *G06F 1/1684* (2013.01); *G06F 3/016* (2013.01); *G06F 1/1694* (2013.01); *G06F 1/1626* (2013.01); *H04M 2250/12* (2013.01)
  USPC ................ 455/556.1; 455/556.2; 340/407.1; 340/407.2; 345/158; 345/173; 345/179; 345/180; 345/183; 178/18.03

(58) Field of Classification Search
  CPC ............. H04M 1/00; H04R 1/88; H04R 1/10; H04R 3/36; H04N 5/64; H04N 5/228; H02K 41/03; H02K 41/035; G01D 21/00
  USPC ............. 455/556.1, 556.2; 340/407.1, 407.2; 345/158, 173, 179, 180, 181, 182, 183; 382/310–315, 187, 188, 189, 119, 186; 178/18.03, 19.01, 19.04, 19.05
  See application file for complete search history.

(56) References Cited

U.S. PATENT DOCUMENTS

| | | | | |
|---|---|---|---|---|
| 6,001,014 | A * | 12/1999 | Ogata et al. .................. 463/37 |
| 7,130,622 | B2 * | 10/2006 | Vanska et al. ................. 455/419 |
| 7,724,278 | B2 * | 5/2010 | Maguire, Jr. ................. 348/121 |
| 7,868,489 | B2 * | 1/2011 | Amemiya et al. ......... 310/12.16 |
| 7,956,498 | B2 * | 6/2011 | Amemiya et al. ......... 310/12.16 |
| 2002/0149561 | A1 * | 10/2002 | Fukumoto et al. ............ 345/156 |
| 2006/0119189 | A1 * | 6/2006 | Fujinaga ......................... 310/12 |
| 2006/0126946 | A1 * | 6/2006 | Denoue et al. ............... 382/229 |
| 2007/0091063 | A1 | 4/2007 | Nakamura et al. |
| 2007/0173266 | A1 * | 7/2007 | Barnes ...................... 455/456.1 |

(Continued)

FOREIGN PATENT DOCUMENTS

| | | |
|---|---|---|
| JP | 7112074 | 5/1995 |
| JP | 11004996 | 1/1999 |

(Continued)

*Primary Examiner* — Edward Urban
*Assistant Examiner* — Ralph H Justus
(74) *Attorney, Agent, or Firm* — Frommer Lawrence & Haug LLP

(57) ABSTRACT

A mobile apparatus which is carriable by a user includes a force-sense generating mechanism which imparts, to the user, a force-sense in a predetermined direction to induce an input operation to the user; a motion sensor which detects a motion imparted by the user while the force-sense generating mechanism imparts the force-sense to the user or after the force-sense generating mechanism has imparted the force-sense to the user; and a controller which controls the force-sense generating mechanism, and which recognizes the input operation by the user, based on the motion detected by the motion sensor.

7 Claims, 12 Drawing Sheets

(56) References Cited

U.S. PATENT DOCUMENTS

| | | |
|---|---|---|
| 2009/0128450 A1* | 5/2009 | Nakabayashi et al. ............ 345/8 |
| 2009/0280860 A1* | 11/2009 | Dahlke ...................... 455/556.1 |
| 2010/0101480 A1* | 4/2010 | Sugahara ...................... 116/205 |
| 2013/0210497 A1* | 8/2013 | Gerhardt et al. ........... 455/569.1 |

FOREIGN PATENT DOCUMENTS

| | | | | |
|---|---|---|---|---|
| JP | 2001-186248 | | 7/2001 | |
| JP | 2002346225 | | 12/2002 | |
| JP | 2005-190465 | | 7/2005 | |
| JP | 2006-65665 | | 3/2006 | |
| JP | 2006074798 A | * | 3/2006 | .............. H04R 1/00 |
| JP | 2006-107140 | | 4/2006 | |
| JP | 2006-229549 | | 8/2006 | |
| JP | 2006229549 A | * | 8/2006 | |
| JP | 2007248478 | | 9/2007 | |
| JP | 2007-304988 | | 11/2007 | |
| JP | 2008-28774 | | 2/2008 | |
| WO | WO 2007086426 A1 | * | 8/2007 | ............. H02K 33/00 |

\* cited by examiner

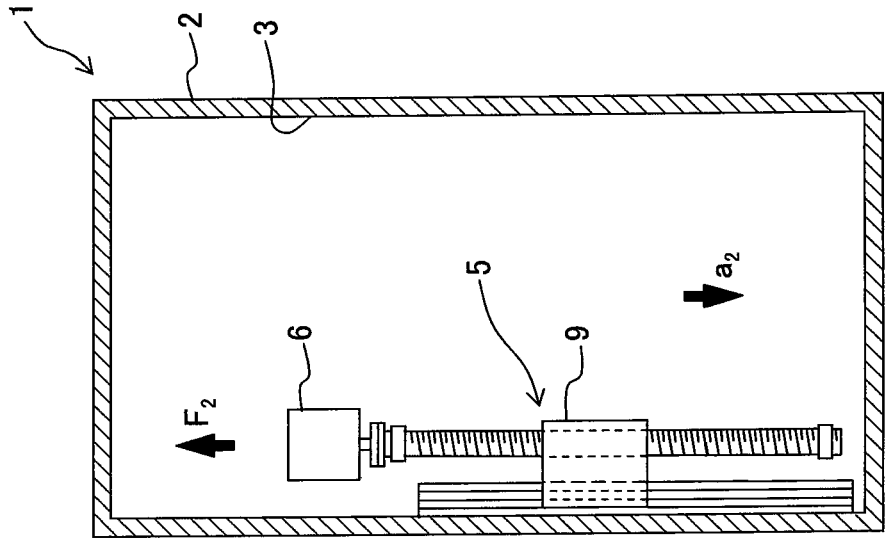
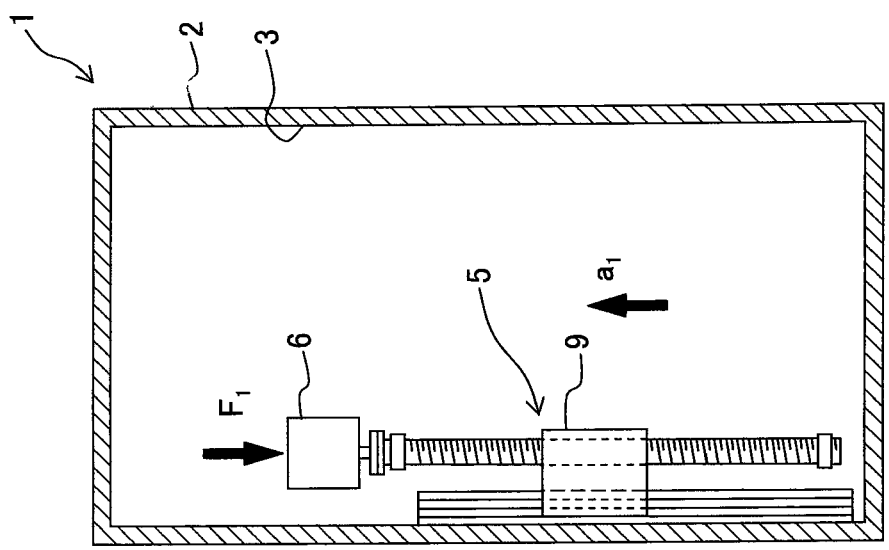

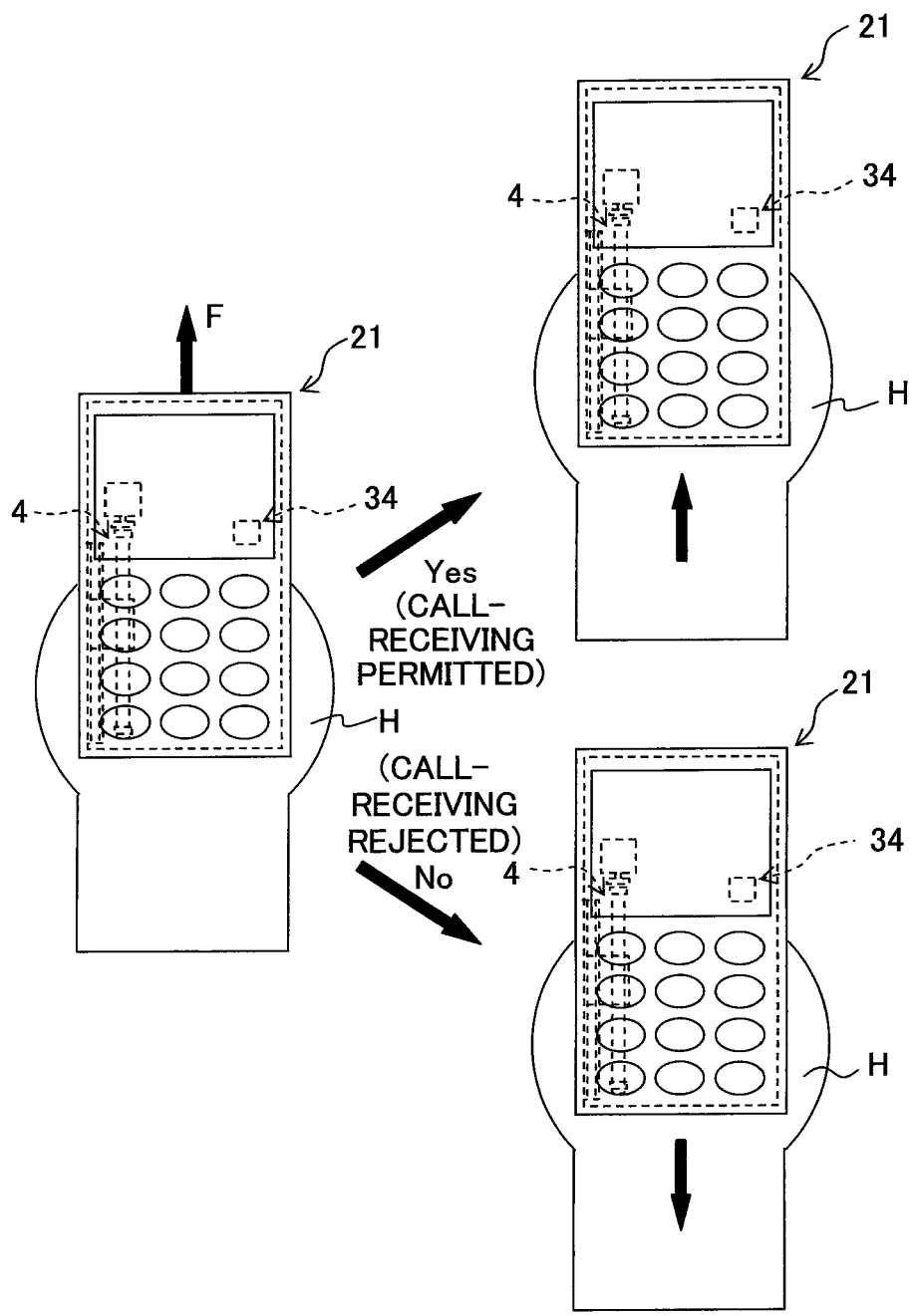

MOBILE APPARATUS

CROSS REFERENCE TO RELATED APPLICATION

The present application claims priority from Japanese Paten Application No. 2008-275253, filed on Oct. 27, 2008, the disclosure of which is incorporated herein by reference in its entirety.

BACKGROUND OF THE INVENTION

1. Field of the Invention

The present invention relates to a mobile apparatus that a user can carry such as, for example, a portable inkjet printer, a mobile telephone, a handset of a landline telephone, a digital still camera, a digital video camera, a portable video game console, a portable audio player, a controller of a stationary type video game console, or a TV remote controller.

2. Description of the Related Art

Such mobile apparatus includes a display unit such as a liquid-crystal panel, and a speaker, and it is possible to provide information to the user by appealing to ears and eyes of the user by the abovementioned devices. Moreover, providing information to the user by appealing to a force-sense (kinesthetic sense) by using an apparatus which imparts a force-sense (pseudo force-sense) which makes the user feel that a translational force has been generated in a casing has been proposed (refer to Japanese Patent Application Laid-open Nos. 2008-28774 and 2006-65665).

When the user receives the information presented, it is possible for the user to carry out various input operations according to the information presented. For instance, a mobile telephone includes a plurality of push buttons as an interface for the user to carry out various input operations (For example, refer to Japanese Patent Application Laid-open No. 2001-186248).

Regarding a situation of carrying out the input operation, when there is an incoming call to a mobile telephone, information indicating that there is an incoming call, is presented to the user by a display unit and a speaker. The push buttons include function buttons which are assigned functions such as inputting a permission to receive a call and inputting a rejection (refusal) to receive a call. The user is capable of making an input operation of accepting or rejecting selectively by pressing one of these push buttons. Moreover, at the time of making a call from the mobile telephone, the user is capable of inputting a telephone number of a counterpart by pressing number buttons of numbers from 0 to 9 which are included in the push buttons. These number buttons also serve a function as buttons for entering characters (alphabets). Therefore, at the time of registering telephone-directory information in a built-in memory, it is possible for the user to enter character information compatible with the information to be registered by pressing appropriately the number buttons.

SUMMARY OF THE INVENTION

In a conventional mobile apparatus, it is possible to present information by appealing to the force-sense. However, in a technique which makes user carry out the input operations as mentioned above, since an operation is restricted to pressing the push buttons, for a user who is not accustomed to use electronic equipments, it is difficult to make a full use of the apparatus. In view of such circumstances, not only a technique for presenting information but also a mobile apparatus which is structured to enable the user to make an input operation more intuitively have been sought.

Therefore, an object of the present invention is to provide a mobile apparatus which enables to make the user carry out the input operation intuitively.

The present invention is made in view of the abovementioned circumstances, and according to an aspect of the present invention, there is provided a mobile apparatus which is carriable by a user, including:

a force-sense generating mechanism which imparts, to the user, a force-sense in a predetermined direction to induce an input operation to the user;

a motion sensor which detects a motion imparted by the user while the force-sense generating mechanism imparts the force-sense to the user or after the force-sense generating mechanism has imparted the force-sense to the user; and a controller which controls the force-sense generating mechanism, and which recognises the input operation by the user, based on the motion detected by the motion sensor.

By making such an arrangement, the user who is induced to carry out the input operation by operating the force-sense generating mechanism, for instance when a certain type of motion is imparted to the casing by an action such as shaking a hand holding the casing accordingly, on equipment side, this motion is identified as an input operation. In this manner, by the user taking an action based on the force-sense imparted to the user, an input operation may be carried out, and as compared to a conventional apparatus in which, an input operation is carried out by pressing a push button according to information presented by appealing to eyes and ears of the user, it is possible for the user to carry out the input operation intuitively.

As it has been described above, according to the present invention, it is possible to provide a mobile apparatus which is structured to make it possible to carry out an input operation intuitively.

BRIEF DESCRIPTION OF THE DRAWINGS

FIG. 4A and FIG. 4B are diagrams explaining a basic operation of the force-sense generating unit shown in FIG. 1, where, FIG. 4A shows a state in which a positive acceleration is generated in a weight of the force-sense generating unit, and FIG. 4B shows a state in which a negative acceleration is generated in the weight of the force-sense generating unit;

FIG. 8 is a diagram explaining an input operation which a user may carry out during execution of the contents of the control shown in FIG. 7;

DETAILED DESCRIPTION OF THE PREFERRED EMBODIMENTS

Figure 1:
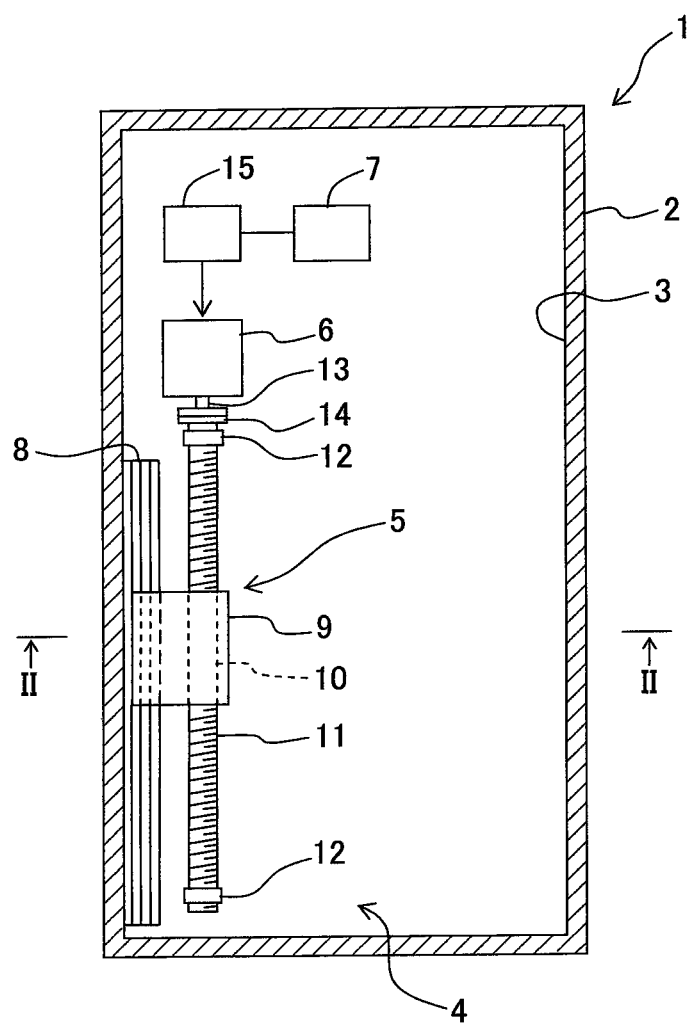
FIG. 1 is a schematic cross-sectional view of a mobile apparatus showing main section of an internal structure of a mobile apparatus according to the present invention.
Figure 2:
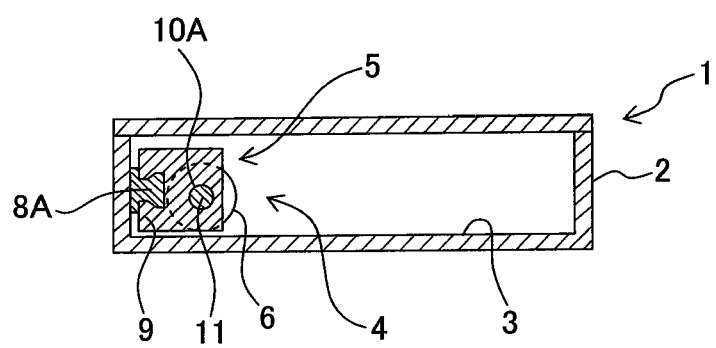
FIG. 2 is schematic cross-sectional view of a mobile apparatus shown upon cutting along a line II-II in FIG. 1.

An embodiment according to the present invention will be described below with reference to the accompanying diagrams. A mobile apparatus shown in FIGS. 1 and 2 is an electronic equipment which a user can carry, such as a mobile ink-jet printer, a mobile telephone, a cordless handset of a land-line telephone, a digital still camera, a digital video camera, a mobile game console, a mobile music player, an operating device (a controller) of a stationary game console, and an operating device (a remote controller) of a television. The mobile apparatus 1 includes a casing 2 which is formed of a size that is easy for a user not shown in the diagram to carry. An internal space 3 is formed at an interior of the casing 2, and a force-sense generating unit 4 (a force-sense generating mechanism) which is operated such that a force-sense is imparted to the user who is holding the casing, is provided in the internal space 3.

Figure 6:
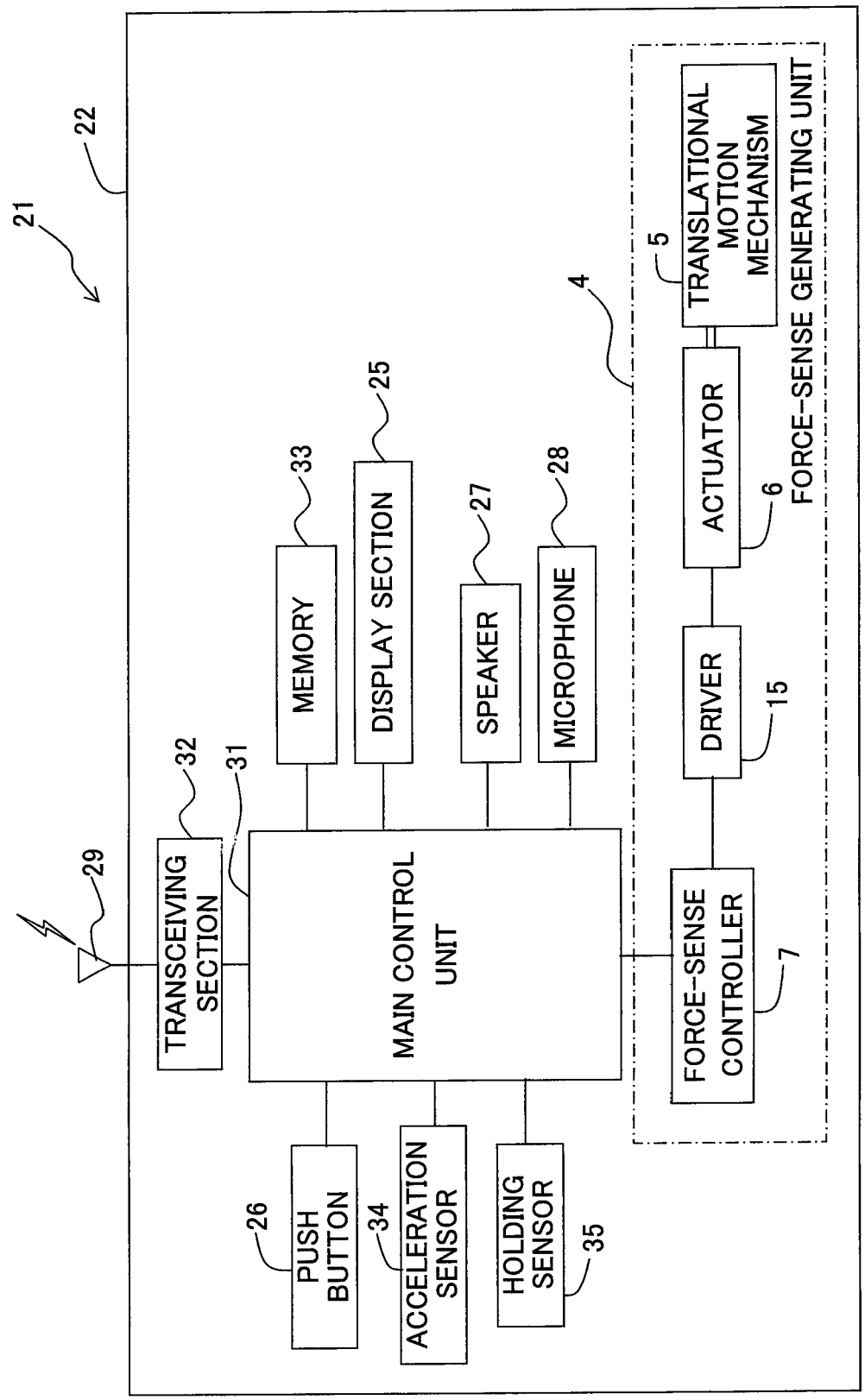
FIG. 6 is a block diagram showing a structure (a configuration) of the mobile telephone shown in FIG. 5.

Firstly, a structure of the force-sense generating unit 4 will be described below. As shown in FIGS. 1 and 2, the, force-sense generating unit 4 includes a translational motion mechanism 5 which is arranged in the internal space 3 of the casing 2, an actuator 6 which drives the translational motion mechanism 5, and a force-sense controller 7 which controls an operation of the actuator 6. As shown in FIG. 6, the force-sense generating unit 4 is indicated by blocks each showing a function of the element.

The translation motion mechanism 5 is provided with a guide rail 8 which is installed on an inner-side surface of the casing 2 and which is extended in one direction. A weight 9 is non-rotatably but slidably supported by guide rail 8, and is reciprocatable inside the casing 2, along a direction of extension of the guide rail 8. A mail-screw hole 10 is cut through the weight, and in a state of the weight 9 supported by the guide rail 8, an axis of the mail-screw hole 10 is directed in the direction of extension of the guide rail 8. A ball screw 11 having threads of a male screw on an outer surface is screwed through the male-screw hole 10. The ball screw 11 is rotatably supported by a bearing 12 installed inside the casing 2, and is incapable of translation (translational motion) in a rotation-axis direction.

The actuator 6 includes an electric motor such as a servo motor and a linear motor. An output shaft 13 which is capable of rotating in a normal direction and a reverse direction is provided to the actuator 6, and the output shaft 13 is coupled with an end portion of the ball screw 11 via a joint 14. When the actuator 6 is driven, the output shaft 13 rotates, and a rotational driving force from the output shaft 13 is input to the ball screw 11, thereby driving the ball screw 11 to be rotated in a predetermined direction. When the ball screw 11, which is incapable of translational motion, rotates, the weight 9, which is incapable of rotating in a direction of rotation and a direction of coiling (a helical direction) of the ball screw 11, is subjected to translation toward one side of the direction of extension of the guide rail 8.

The force-sense controller 7 is connected to the actuator 6 via a driver 15, and controls a direction of rotation, a rotational velocity, and a rotational acceleration of the output shaft 13 of the actuator 6 by outputting a control command to the driver 15. Accordingly, the direction of rotation, the rotational velocity, and the rotational acceleration of the ball screw 11 of the translational motion mechanism 5 are controlled, and furthermore, a position, a direction of movement, a velocity, and an acceleration of the weight 9 are controlled.

Next, a basic operation of the force-sense generating unit 4 will be described below. For convenience of explanation, a direction in which the weight 9 reciprocates is let to be a 'vertical direction' according to the diagram. The velocity when the weight 9 moves upward is let to be positive, and a velocity when the weight 9 moves downward is let to be negative. Regarding the sign of the acceleration generated in the weight 9 and the sign of the force which acts based on the acceleration are also defined by the abovementioned relationship.

Figure 3:
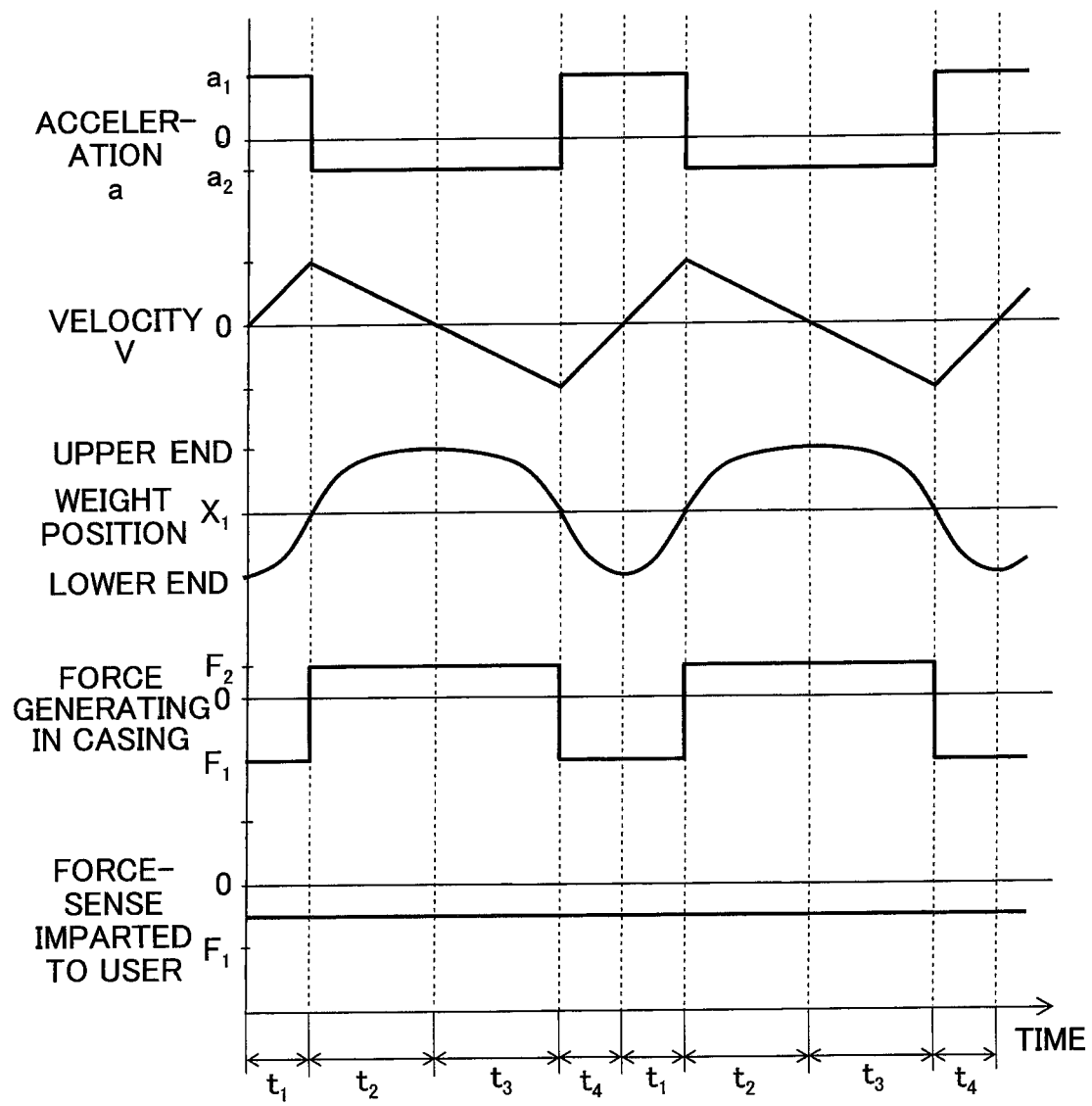
FIG. 3 is a timing chart explaining a basic operation of a force-sense generating unit shown in FIG. 1.

FIG. 3 is a timing chart explaining the basic operation of the force-sense generating unit 4 shown in FIG. 1. In an initial state, it is assumed that the weight 9 is positioned at a lower end of a range of movement, and a velocity V of the weight 9 is 0. As shown in FIG. 3, when the weight 9 undergoes translational motion in an upward direction from the initial state, positive acceleration $a_1$ is generated in the weight 9, and the velocity V of the weight 9 accelerates to the positive side. When a predetermined time $t_1$ is elapsed after the weight 9 starts moving, the weight 9 reaches a predetermined position $x_1$ (a central position of the range of movement in an example shown in FIG. 3), and thereafter, a negative acceleration $a_2$ is generated in the weight 9, and the velocity of the weight 9 goes on decreasing. When a predetermined time $t_2$ has elapsed after the acceleration a has changed to negative, the velocity of the weight 9 becomes 0, and the weight 9 reaches an upper end of the range of movement. Next, the negative acceleration $a_2$ is generated in the weight 9, and the weight 9 moves downward while accelerating the velocity V of a negative side. When a predetermined time $t_3$ is elapsed after the direction of movement of the weight 9 has changed to be downward, the weight 9 reaches the above-mentioned predetermined position $x_1$, and thereafter, the positive acceleration $a_1$ is generated in the weight 9, and the velocity V of the weight goes on decreasing. When a predetermined time $t_4$ is elapsed after the acceleration a has changed to positive, the velocity V of the weight 9 becomes 0, and the weight 9 returns to the lower end of the range of movement. The force-sense generating unit 4 is structured such that this series of reciprocating movements of the weight 9 continues.

As shown in FIG. 4A, when the positive acceleration $a_1$ is generated in the weight 9, a negative force $F_1$ (directed downward) is generated in the casing 2 due to a counteraction, and a translational force in a downward direction corresponding to the force $F_1$ is exerted by the casing 2, onto a hand (palm) of the user who is holding the casing 2. As shown in FIG. 4B, when the negative acceleration $a_2$ is generated in the weight 9, a positive force $F_2$ (directed upward) is generated in the casing 2, and a translational force in an upward direction corresponding to the force $F_2$ is exerted by the casing 2, onto the hand of the user who is holding the casing 2. When a mass of the weight 9 is M, the forces $F_1$ and $F_2$ shown in FIGS. 4A and 4B is obtained by the equations of motion $F_1=M \cdot (-a_1)$, and $F_2=M \cdot (-a_2)$.

As shown in FIG. 3, an absolute value of the positive acceleration $a_1$ is higher than an absolute value of the negative acceleration $a_2$, and an absolute value of the negative force $F_1$ is higher than an absolute value of the positive force $F_2$ ($|a_1|>|a_2|$ and $|F_1|>|F_2|$). The force-sense controller 7 controls the rotational velocity and the rotational acceleration of the output shaft 13 such that such movement of the weight 9 is realized. Accordingly, two asymmetrical forces of different magnitude continuously act alternately on the user.

Here, a human being has a sensory property of being insensitive to a moderate force. A point that the sensory property of a human being has a nonlinearity is a known phenomenon (refer to Japanese Patent Application Laid-open Nos. 2008-28774 and 2006-65665). Therefore, a description in detail of this point is omitted in this patent application.

As a result, the user in such situation, derived from user's own sensory property, has a false feeling that only a translational force in a downward direction which is a strong force as shown in a chart at the lowest stage in FIG. 3 has been acting. In other words, when the weight 9 reciprocates continuously, the force-sense generating unit 4 drives the actuator 6 such that the absolute value of the positive acceleration and the absolute value of the negative acceleration generated in the weight are different. Accordingly, it is possible to impart to the user holding the casing 2, a pseudo force-sense which makes the user feel that a translational force in one side of the direction in which the weight 9 moves is exerted by the casing 2.

An operation pattern of the weight 9 shown in FIG. 3 is only an example and various modifications which fall within a range in which the pseudo force-sense is imparted to the user are possible. For example, when the absolute value of the negative acceleration is higher than the absolute value of the positive acceleration, the direction of the translational force which is sensed virtually (pseudolly) by the user becomes opposite. For simplifying the explanation, a pattern in which the velocity V changes linearly has been shown in the above examples. However, the velocity V may change nonlinearly such that the absolute value of the positive acceleration and/or the absolute value of the negative acceleration change/changes as the time elapses. In this case, the weight is reciprocated such that the maximum value of the absolute value of the positive acceleration generated in the weight 9 is different from the maximum value of the absolute value of the negative acceleration generated in the weight 9. The position $x_1$ of the weight 9 at which the acceleration 'a' changes from positive to negative and vice versa is not restricted to the central position in the range of movement, and can be changed appropriately, and the time $(t_1+t_2+t_3+t_4)$ which is necessary for the reciprocating movement of the weight 9 can be set appropriately.

Typically, the mass of the weight is about 20 g, and a length of a stroke and a magnitude of an acceleration of the reciprocating movement of the weight 9 are in a range of about 5 cm to 10 cm, and 1 G to 5 G, respectively. Moreover, it is preferable that a frequency of the reciprocating movement of the weight 9 is in a range of few Hz to few tens of Hz, and particularly, is about 10 Hz. The mass of the weight 9, and the stroke, the acceleration, and the frequency of the reciprocating movement of the weight 9 are not restricted to the above-mentioned example as shown in the figures, and these parameters may be set according to a size of the casing 2, and a magnitude of the translational force which is generated.

Moreover, it is also possible to change appropriately the structure of the force-sense generating unit 4 shown in FIGS. 1 and 2. In the abovementioned example, a structure in which the ball screw 11 rotates in synchronization with the output shaft 13 has been shown. However, a power transmission mechanism which changes the rotational velocity, or which changes the direction of rotation, or which changes the rotation-axis direction may be interposed between the output shaft 13 and the ball screw 11. Moreover, the translational motion mechanism 5 has a structure such that the rotational driving force generated by the actuator 6 is converted to the translational movement of the weight 9 by using a screw mechanism. However, any structure may be used provided that it is possible to make the weight 9 reciprocate by making the positive acceleration and the negative acceleration differ. For example, the translational motion mechanism 5 may have a linear motor, or, may have a pulley and a belt coupled with a motor.

Next, a concrete structure for inducing an input operation to the user by an operation of the force-sense generating unit 4, and for making the user who is induced, to carry out the input operation intuitively will be described below. Here, the description is made by citing an example of a mobile telephone as a mobile apparatus according to the present invention.

Firstly, as a first example, a mobile telephone 21 which is structured such that a reply of 'YES' or 'NO' is input selectively only by imparting a motion to a casing 22 by the user will be described below.

Figure 5:
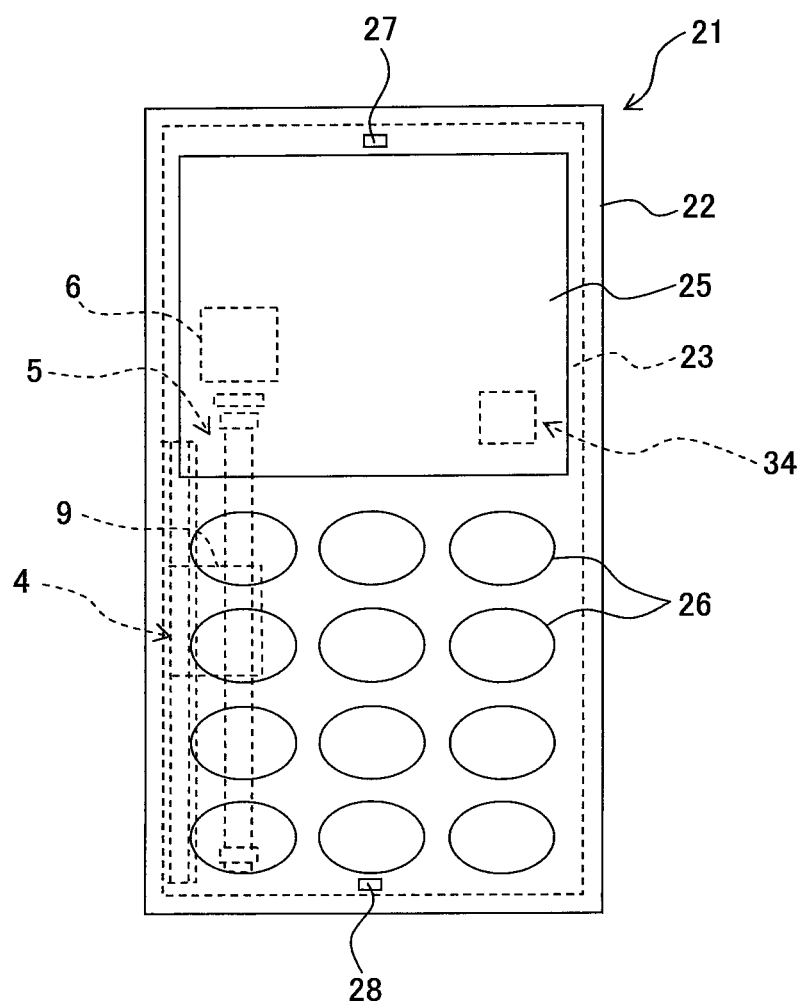
FIG. 5 is a front view of a mobile telephone which is shown as an example of an embodiment of the mobile apparatus according to the present invention.

A casing 22 of the mobile telephone 21 shown in FIG. 5 is substantially rectangular parallelepiped shaped, and the force-sense generating unit 4 described above is provided in an internal space 23 formed in the casing 22. The mobile telephone 21 includes a display unit 25 which is provided at an upper portion on a front surface of the casing 22, a plurality of push buttons 26 for input operation which are provided at a lower portion on the front surface of the casing 22, a speaker 27 which is provided at an upper end portion on the front surface of the casing 22, and a microphone 28 which is provided at a lower end portion on the front surface of the casing 22.

The mobile telephone 21 is provided with a main control section (a control mechanism) which carries out an overall control of various functions. The main control section 31 is connected to the display unit 25 and the push buttons 26. The main control section 31 is capable of carrying out a control of making display appropriate image information on the display unit 25. Moreover, when the push button 26 is pressed, an operation signal is input to the main control section 31.

Moreover, the main control section 31 is connected to the speaker 27 and the microphone 28, and is also connected to an antenna 29 via a transceiving section 32. When the antenna receives a reception high-frequency signal from a base station which is not shown in the diagram, the transceiving section 32 outputs the signal to the main control section 31. Accordingly, the control mode shifts to a 'call-receiving mode' (an incoming-call mode), and the main control section 31 presents to the user information that there is an incoming call, by displaying on the display unit 25 image information indicating a telephone number of a person who has made the call, and waits for a permission or a rejection for receiving a call (taking a call). When an input operation for permission for receiving the call is carried out, the control mode shifts to a 'call mode' (communication mode), and the transceiving section 32 demodulates the reception high. Frequency signal from the base station which has been received via the antenna 29, and outputs to the main control section 31. The main control section 31 processes the signal which has been input from the transceiving section 32, and outputs the processed signal to the speaker 27. On the other hand, the main control section 31 processes an audio signal which has been input from the microphone 28, and outputs the processed audio signal to the transceiving section 32. The transceiving section 32 transmits to the antenna 29 upon converting to a transmission high-frequency signal, after modulating the signal from the main control section 31.

Furthermore, the main control section 31 is connected to the force-sense controller 7 of the force-sense generating unit 4. The force-sense controller 7 controls the actuator 6 such that the weight 9 reciprocates to impart to the user a force-sense of a translational force in a direction based on a command from the main control section 31 (refer to FIG. 1).

A motion detecting sensor 34 (a motion detecting mechanism) which detects a motion imparted to the casing 22, and a holding sensor 35 (holding detecting mechanism) which detects whether or not the user is holding the casing 22 are connected to the main control section 31. Concretely, the motion detecting sensor 34 includes a sensor such as an acceleration sensor which detects an amplitude and a direction of an acceleration generated in the casing 22. The holding sensor 35 includes a sensor such as a pressure sensor which detects a pressure applied onto an outer surface of the casing 22, an inclination-angle sensor which detects an angle of inclination of the casing 22, and a touch sensor having an electrode installed on the casing 22, which detects a contact with the user based on a phenomenon in which an electrostatic capacitance changes when the user touches the electrode. When the inclination-angle sensor is used as the holding sensor 35, an angle of inclination corresponding to a posture of the casing 22 which is appropriate for the user to face the display unit 25 in order to use the mobile phone is stored in advance. Moreover, when the angle of inclination detected by the inclination-angle sensor, continuously for a predetermined time, is in a predetermined range including the angle of inclination which is stored, the main control section 31 may make a judgment that the user is holding the casing 22. Moreover, when the motion detecting sensor 34 has detected an acceleration in an upward direction after a stationary state (zero acceleration state) is continued for not less than a predetermined time, the main control section 31 may make a judgment that the user picks the casing 22 up which was located on a table etc. In this case, the motion detecting sensor 34 also serves as the holding sensor 35.

Figure 7:
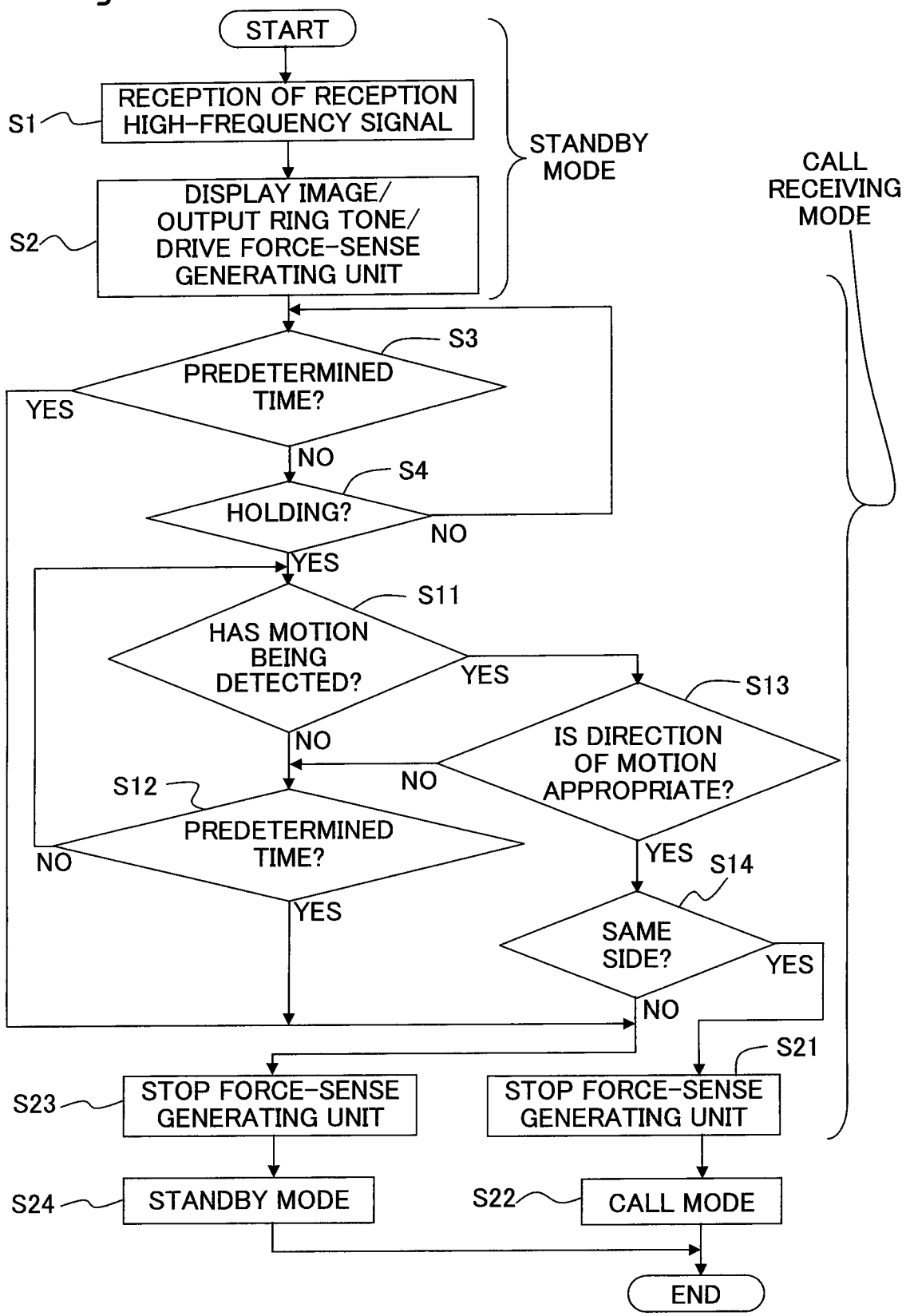
FIG. 7 is a flowchart explaining contents of a control which is carried out by a main control section shown in FIG. 6.

Next, contents of control carried out by the main control section 31 will be described below with reference to FIGS. 7 and 8. As shown in FIG. 7, when the main control section 31 inputs a signal indicating that the reception high-frequency signal has been received by the transceiving section 32 (step S1), the control mode shifts from the standby mode to the call-receiving mode (incoming-call mode). When the control mode changes to the call-receiving mode, the main control unit 31 waits for an input operation permitting the incoming call (input operation of 'YES') or an input operation rejecting the incoming call (input operation of 'NO'), from the user. At this time, the main control section 31, first of all, displays on the display unit 25, the image information indicating the telephone number of a person who has made the call, and also outputs a ring tone signal determined in advance, to the speaker 27 (step S2). Accordingly, information indicating that there is an incoming call is presented to the user by appealing to eyes by the display section 25 and by appealing to ears by the speaker 27.

At the same time, the main control section 31 imparts a command to the force-sense controller 7, and starts an operation of the force-sense generating unit 4 (step S2). At this time, the absolute value of the positive acceleration and the absolute value of the negative acceleration generated in the weight 9 are set to be mutually different as shown in FIG. 3. Accordingly, the positive force $F_1$ (refer to FIG. 4) and the negative force $F_2$ (refer to FIG. 4) of mutually different magnitudes are generated alternately in the casing 22. At a left side in FIG. 8, a situation in which the user is holding the casing 22 of the mobile telephone 21 in a hand H in the call-receiving mode (incoming-call mode) is shown schematically. In this situation, a pseudo force-sense which makes feel that a translational force F on one side (upper side in FIG. 8) in a direction in which the weight 9 (refer to FIG. 4) reciprocates, is imparted to the user.

Next, a judgment of whether or not a predetermined time has elapsed after the start of driving of the force-sense generating unit 4 (step S3) is made. When the predetermined time has not elapsed (NO at step S3), a judgment of whether or not the user is holding the casing 22 is made based on an input from the holding sensor 35 (step S4). When the user is not holding the casing 22 (NO at step S4), the process returns to step S3, and steps S3 and S4 are repeated. When the predetermined time elapses without the user holding the casing 22 (YES at step S3), the main control section 31 stops the force-sense generating unit 4 (step S23), and the control mode is shifted from the call-receiving mode to the standby mode (step S24).

When the user holds the casing 22 during the predetermined time (YES at step S4), a judgment of whether or not the user has imparted the motion to the casing 22 is made based on an input from the motion detecting sensor 34 (step S11). When the motion has not been imparted (NO at step S11), a judgment of whether or not the predetermined time has elapsed since the start of driving of the force-sense generating unit 4, is made (step S12). When the predetermined time has not elapsed (NO at step S12), the process returns to step S11, and steps S11 and S12 are repeated. When the predetermined time is elapsed without the motion being imparted to the casing 22 (YES at step S12), similarly as described above, the main control section 31 stops the force-sense generating unit 4 (step S23), and the control mode is shifted from the call-receiving mode to the standby mode (step S24).

When the motion is imparted to the casing 22 during the predetermined time (YES at step S11), a judgment of whether or not a direction of the motion is within an acceptable range determined in advance is made (step S13). The acceptable range is determined based on a direction in which the translational force which is imparted pseudolly to the user acts, in an example in FIG. 8, the direction in which the imparted translational force acts is directed upward in a vertical direction (a longitudinal direction) of the casing 22. In this case, the acceptable range is determined based on the vertical direction (the longitudinal direction) as the reference direction, and is set to be a predetermined angular range with respect to a line parallel to the direction of the translational force F. The angular range regarding a front view is shown in FIG. 8, and similar angular ranges regarding a plan view and a side view can be also determined. When the direction of the motion imparted to the casing 22 is a horizontal direction (transverse direction), and is not within the acceptable range (NO at step S13), this horizontal motion is not considered to he an intended motion which is imparted with the intention of carrying out an input operation, and the process returns to step S12 and step 11, and a motion being imparted to the casing 22 is awaited once again.

When the direction of the motion imparted to the casing 22 is within the acceptable range (YES at step S13), a judgment of whether the direction of motion imparted is substantially the same side or substantially the opposite side of the direction in which the translational force imparted pseudolly to the user acts, is made (step S14). In other words, in the example shown in FIG. 8, when the direction of motion, when viewed from a central position of the casing 22, is within the acceptable range, and is directed upward, a judgment is made that the direction of motion is 'substantially the same side', and when the direction of motion is opposite to this, a judgment is made that the direction of motion is 'substantially the opposite side'. In this manner, through the judgment process at step S13, it is not necessary that the direction of motion imparted to the casing 22 coincides completely with the direction in which the translational force imparted pseudolly acts, or it is not necessary that the direction of motion imparted to the casing 22 differs from the direction in which the translational force imparted pseudolly acts by exactly 180 degrees.

As shown at a lower-left side of FIG. 8, when the user acts counter to the translational force acting on the hand H of the user, and a translational motion toward a substantially opposite side of the direction in which the translational force acts is imparted to the casing 22 (NO at step S14), the main control section 31 senses this as an input operation rejecting the incoming call. In other words, the main control section 31 stops the force-sense generating unit 4 (step S23), and the control mode shifts from the 'call-receiving mode' (incoming-call mode) to the standby mode (step S24).

As it has been shown schematically at an upper-right side of FIG. 8, when the user has imparted to the casing 22, the translational motion toward the substantially same side as the direction in which the translational force acts, according to the translational motion which acts on the hand H of the user (YES at step S14), the main control section 31 senses this motion as an input operation allowing (accepting) the incoming call. In other words, the main control section 31 stops the force-sense generating unit 4 (step S21), and the control mode is shifted from the 'call-receiving mode' to the abovementioned 'call mode' (step S22).

In this manner, according to this example, when a condition that the mobile telephone 21 awaits an input operation from the user is assumed, an input operation is induced to the user holding the mobile telephone 21 (or the casing 22) by imparting the force-sense to the user. When the user moves the casing 22 according to the direction in which the translational force imparted to the user acts, an equipment senses an input operation based on this motion. Therefore, the user, without relying on an operation of pressing the push buttons 26, is capable of carrying out an input operation intuitively.

Moreover, an arrangement is made such that a force-sense makes feel the user that the translational force has been acting on the user, and that an input operation of making 'YES' response is carried out only by moving the casing 22 toward the same side as the direction in which the translational force acts, and an input operation of making 'NO' response is carried out only by moving the caring 22 toward the opposite side of the direction in which the translational force acts. Since the operation of the force-sense generating unit 4 is associated with the direction of motion corresponding to the input of the response of YES and NO in such manner, the user is capable of carrying out the input operation YES or NO intuitively.

Furthermore, since the holding sensor 35 is used, when the user is not holding the casing 22, even when a motion is imparted abruptly to the casing 22, this motion is not sensed as an input operation. Moreover, even after the user held the casing 22, when the direction of motion is not within the acceptable range determined based on the direction in which the translational force imparted to the user acts, this motion is not sensed as an input operation. In this case, it is possible to prevent the main control section 31 from recognizing wrongly as an input operation being carried out based on the motion imparted to the user unintentionally by the casing 22.

When the user held the casing 22 during the predetermined time (YES at step S4), and when the predetermined time has elapsed (YES at step S12) without the motion being imparted (NO at step S11) and the force-sense generating unit 4 is stopped (step S23), the control mode may not be shifted to the standby mode (step S24) immediately, even when it is after the force-sense generating unit 4 has been stopped. Only during the time since stopping the force-sense generating unit 4 till a certain fixed time is elapsed, a standby mode may be assumed in a state of being capable of detecting the motion imparted to the casing 22 such that an input from the user is allowable. In this case, even when a user who is not accustomed to handling the equipment imparts a motion after being puzzled for a while upon holding the casing 22, it is possible to detect the motion imparted by the user.

Here, as a situation of making carry out the input operation of the response YES/NO, an example of a situation of selecting as to whether the control mode is to be shifted to the 'call mode' (communication mode) by allowing an incoming call when the mobile phone receives a call, or the control mode is to be shifted to the 'standby mode' by rejecting the incoming call, is shown. However, it is also applicable favorably to other situations. In the abovementioned example, the description of a case of making carry out the input operation for two types of responses namely allowing the incoming call and rejecting the incoming call, has been made. However, the present invention is not restricted to such a case, and an input operation for three or more than three types of responses may be made to be carried out. For example, in the abovementioned example, the control mode may be shifted to a 'telephone-message recording mode' when the casing 22 is shaken once in a direction intersecting the direction of the force-sense of the translational force which the force-sense generating unit 4 imparts to the user (such as a left-right direction of FIG. 8). Moreover, when the casing is shaken for plurality of times in the abovementioned direction of intersecting, a call may be transferred to a telephone number determined in advance. In this manner, the main control section 31 may associate the abovementioned three types of operations to be carried out on the casing 22 by the user, to different input operations respectively. In other words, when the main control section 31 detects the motion imparted to the casing 22 by the user, the main control section 31 may select one input operation from at least two optional input operations, based on the motion which has been detected.

Next, as a second example, a case in which character information (alphabet information) is input only by shaking the casing 22 according to the stroke order will be described below. In this case also, the description will be made by citing an example of the mobile telephone 21 as shown in FIG. 5 and FIG. 6 as a mobile apparatus according to the present invention. As a situation in which the user inputs the character information at the time of using the mobile telephone, there are various situations such as, a situation when registering telephone-directory information in a memory 33, a situation when using a mail function by inputting sentences which are to be transmitted, and a situation when using a web-browsing function by inputting character information in a form.

However, as described later, in the second example, it is preferable that the direction of the translational force acting on the casing 22 is not only a longitudinal direction, and that a translational force in an arbitrary direction within a plane can act on the casing 22. For realizing this, it is preferable to add in the casing 22, a force-sense generating unit which operates to impart a force-sense of a translational force in a horizontal direction of the casing, separately from a force-sense generating unit which operates to impart the force-sense of the translational force in the longitudinal direction shown in FIG. 5. Since these two force-sense generating units are operable independently, each force-sense generating unit is capable of generating a translational force of mutually different magnitude according to the requirement. Accordingly, it is possible to impart the translational force in the arbitrary direction within a plane parallel to a front face shown in FIG. 5.

When the user inputs a plurality of character information, the main control unit 31 of the mobile telephone 21 shown in FIG. 6 stores, in the memory 33, the plurality of character information upon being associated in an order from the first character, as word information or phrase information. Therefore, thereafter, when the user has input the first character of which character information is included in the plurality of character information which has been input before, the main control section 31 is capable of reading out the plurality information by referring to the memory 33.

Figure 9A:
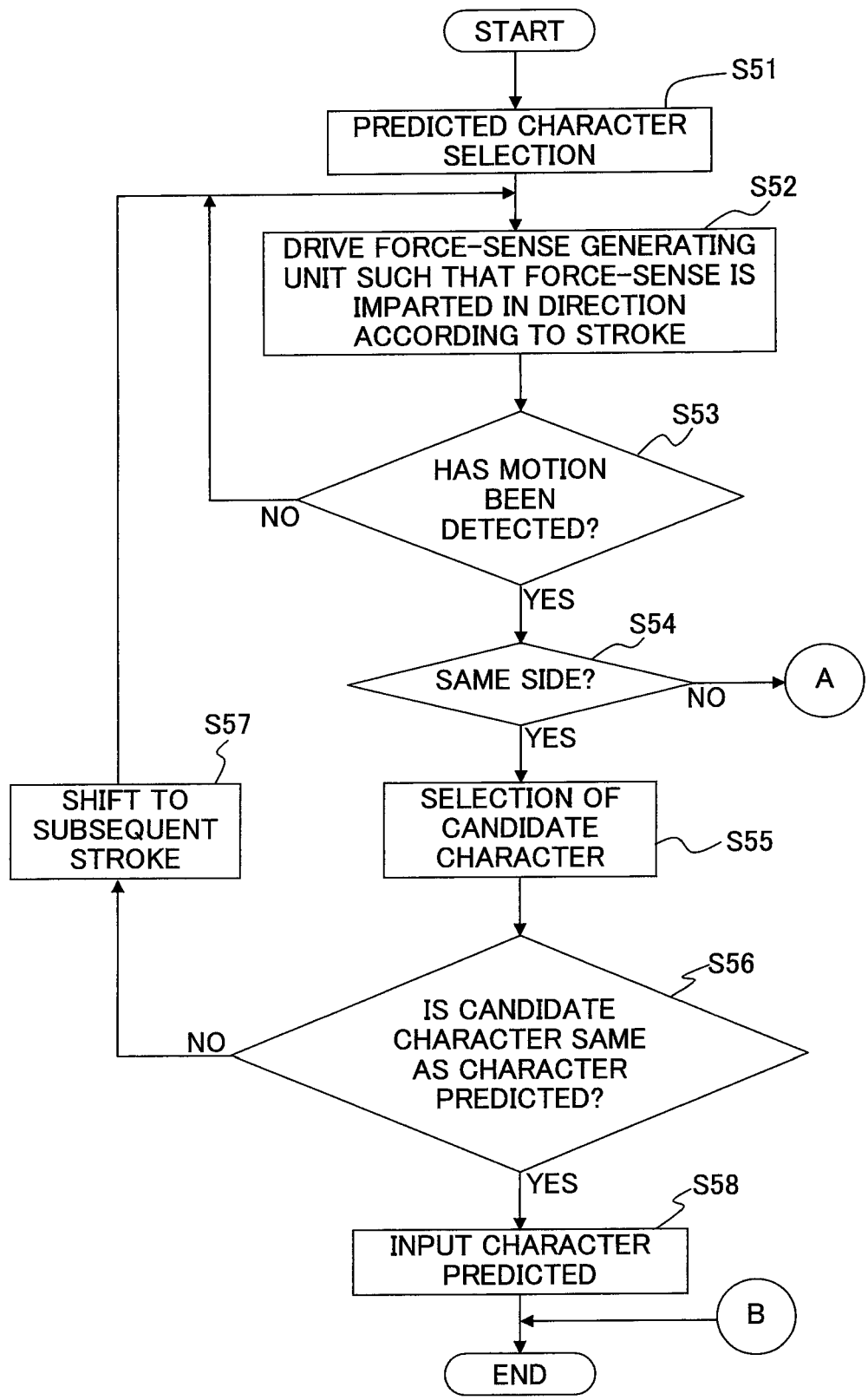
FIGS. 9A and 9B are flowcharts explaining the contents of the control executed by the main control section shown in FIG. 6.
Figure 9B:
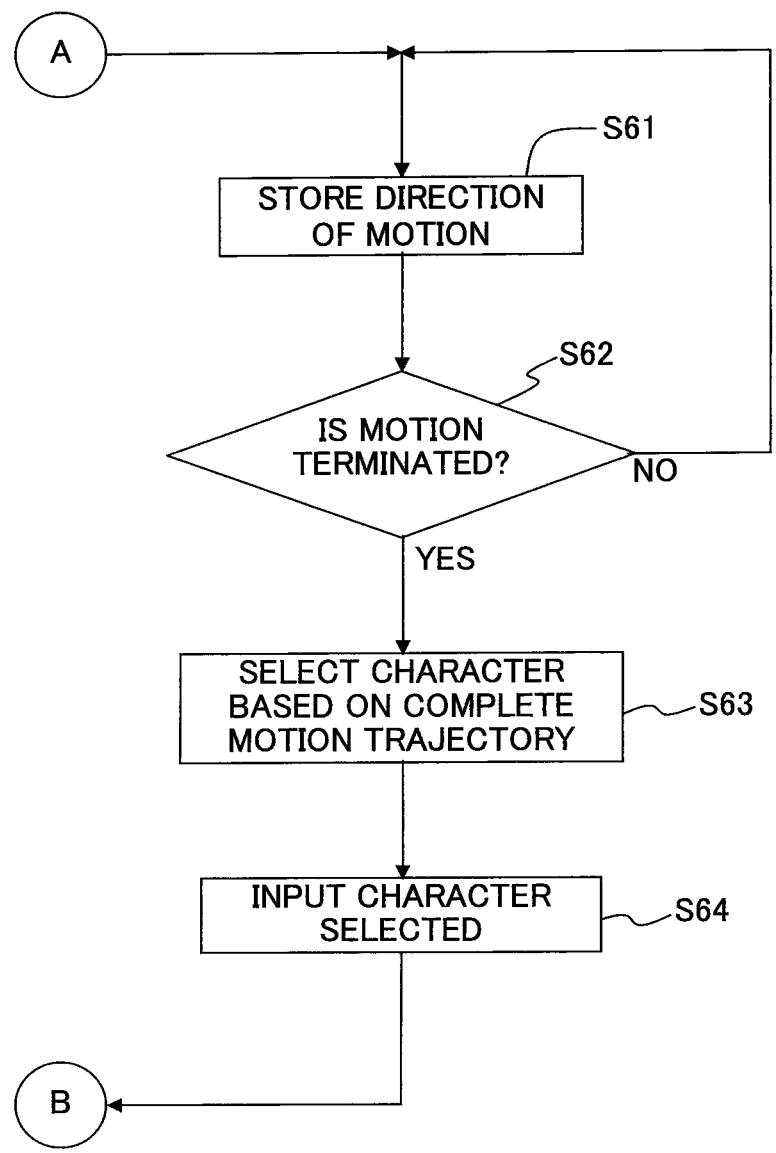

FIGS. 9A and 9B show the contents of control which is carried out in a situation in which the user inputs plurality of character information, and in which the user inputs the character information from a second character onward. Here, the description will be made upon assuming a situation in which the user, who intends to input a word 'ABILITY', has completed input operation of character information of the first character 'A', and is about to input character information of 'B'.

As shown in FIGS. 9A and 9B, the main control section 31 selects a character which is predicted to be input subsequently (hereinafter, called as 'predicted character'), by referring to word information or phrase information) associated with the character information 'A' which has already been input (step S51). A priority order of the character to be selected may be determined in any manner. For instance, word information which has been input most recently may be referred to with the highest priority, and the predicted character may be selected based on the word information which is referred to with the highest priority. Here, the description will be made by assuming that word 'ABROAD' has been referred to with the highest priority, and 'B' has been selected as the predicted character.

Figure 10A:
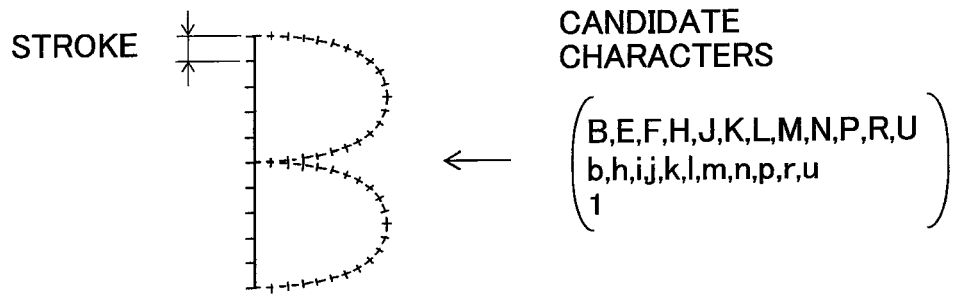
FIGS. 10A, 10B and 10C are conceptual diagrams explaining (the contents of) the control shown in FIG. 9.

Here, a letter form (letter shape) of each character is divided in predetermined strokes, and the divided strokes are connected by straight lines. Therefore, even when that particular letter form includes a curved line, it is possible to substantially approximate that letter form. For each character, stroke information which creates upon dividing that letter form has been stored in advance. The stroke information is associated with the order information which indicates, according to the stroke order, as to what numbered stroke it is. Furthermore, information of direction of extension of the straight lines when the strokes are connected by straight lines according to letter form (hereinafter, called as 'straight-line direction information') is associated with the stroke information. As shown in FIG. 10A, stroke information of 34 pieces of strokes is set in the character information 'B'. Order information of '1' to '10' in order from top, and straight-line direction information indicating a 'downward perpendicular' direction are associated with the ten stroke-information corresponding to a first vertical line portion.

Regarding the predicted character which has been selected, the main control section 31 selects the stroke information associated with the order information in order of priority. In other words, in, a process of initial stages of control, the main control section 31 selects the stroke information associated with the order information of '1', and in a subsequent process, the main control section 31 selects the stroke information associated with the order information '2'. In this manner, the main control section 31 selects the stroke information associated with the order information one after the other is selected sequentially, and drives the force-sense, generating unit 4 based on the straight-liter direction information associated with the stroke information (step S52). In other words, the force-sense generating unit 4 is driven such that the direction in which the translational force imparted to the user holding the casing 22 acts coincides with the direction indicated in the straight-line direction information. Moreover, the main control section 31 detects whether the motion is imparted to the casing 22 based on the input from the motion detecting sensor 34 (step S53), and when the motion is not imparted to the casing 22 (NO at step S53), the main control section 31 drives the force-sense generating unit 4 continuously.

When the motion is imparted to the casing 22 (YES at step S53), the main control section 31 compares the direction of motion which the motion detecting sensor 34 has detected, and the direction in which the force imparted to the user acts (in other words, the direction which the straight-line direction information indicates) (step S54). As a result of the comparison, when the direction of motion is substantially the same as the direction in which the force imparted to the user acts (YES at step S54), the main control section 31 selects a character of a letter form determined between the stroke associated with the order information of '1' up to the stroke (step S55) as a candidate character. Further, the main control section 31 makes a judgment of whether or not the candidate character which is selected is limited only to the predicted character.

When a force-sense is imparted to the user based on the stroke information related the order information of '10' at step S52, and thereafter, the process has advanced up to step S55, as shown in FIG. 10A, there exist 24 candidate characters including the predicted character 'B'. In this manner, when the candidate character is not limited to the predicted character (NO at step S56), the process shifts to a process based on the stroke information related to the order information of next priority (step S57), and regarding the stroke information, the process is executed once again from step S52.

Figure 10B:
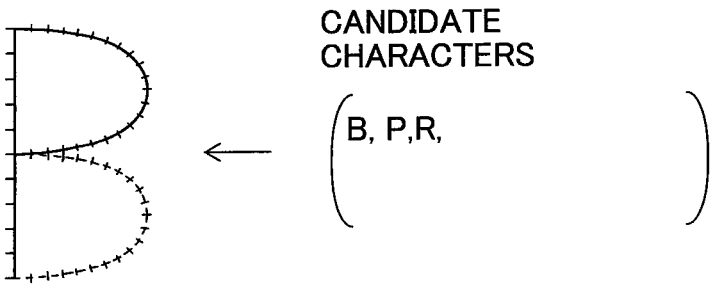

In FIG. 10B, a situation in which the process is repeated along this flow, and the process is advanced up to step S55 regarding the stroke information related to the order information of '32' is shown conceptually. In this situation, the candidate characters are limited to three characters including the predicted character 'B'. The process advances from a judgment process at step S56 to step S57, and regarding the stroke information related to the order information of '23', the process is executed once again from step S52.

Figure 10C:
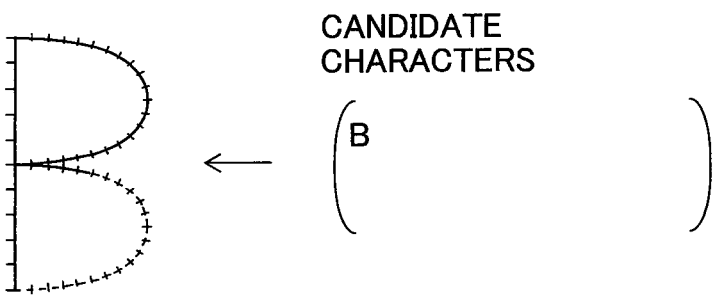

In FIG. 10C, a situation in which the process has advanced up to step S55 is shown conceptually regarding the stroke information related to the order information of '23'. In this situation, the candidate alphabets are limited (restricted) only to the predicted alphabet 'B' at step S55. When the candidate characters are limited only to the predicted character in this manner (YES at step S56), the main control section 31 senses that this predicted alphabet is subjected to input operation (step S58), and terminates the process.

In this manner, it is possible to carry out an input operation of the character information even without the user required to move the casing 22 along the complete stroke order of the character desired to be input.

While the main controls section 31 selects 'B' as the predicted character, it is assumed that the character which the user is about to input is 'R'. As shown in FIG. 10B, till reaching the stroke related to the order information of '33', a process from step S52 to step S55, and returning to step S52 via step S57 is carried out repeatedly. Thereafter, the user moves the casing 22 inclined downward to right, and in the judgment process at step S54, the direction of motion to be imparted to the casing 22 differs substantially from the direction in which the force imparted to the user acts. In such case (NO at step S54), a judgment of whether or not the motion is completed is made (step S62). When the motion is not completed (NO at step S62), the process returns to step S61. In other words, the main control section continues to store the direction of motion imparted to the casing 22 till the motion is completed.

When the motion imparted to the casing 22 is completed (NO at step S62), based on the direction of motion at each step stored in the memory 33, and based on a trajectory of motion of the casing 22 since the motion to be imparted to the casing 22 starts till the motion is completed, the main control section 31 senses the characters selected in such manner as alphabets subjected to the input operation as character information (step S64) and terminates the process.

In this manner, when the user continues to move the casing 22 along the stroke order of an alphabet which the user desires to input countering the force by acting counter to the force which is imparted to the user, it is possible to carry out the input operation of the character information which the user desires to input following the trajectory of movement of the casing 22.

For making the user carry out the input operation of the character information, a direction of arrangement of the characters may be taught to the user in the beginning. In other words, for making the user carry out the input operation of the alphabet in formation, a pseudo force-sense which makes feel that the translational force has been acting, is imparted to the user. The user is taught the direction of arrangement of characters accordingly. An arrangement may be made such that, a plurality of character information is inputted such that the characters are arranged according to the direction in which the translational force imparted virtually acts on the user.

Figure 11:
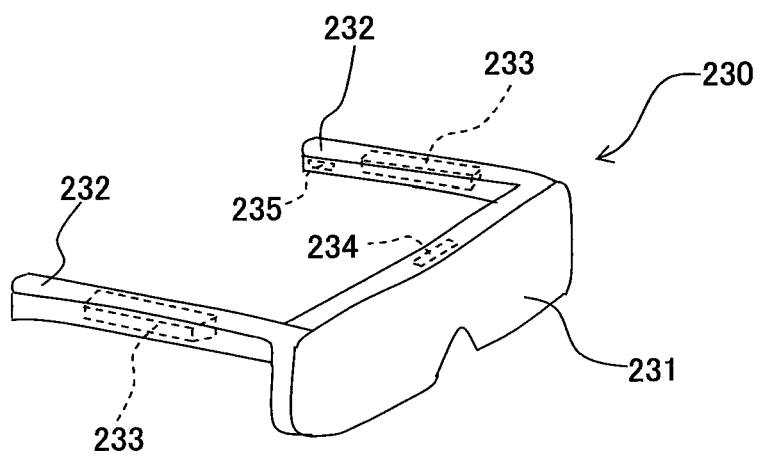
FIG. 11 shows a head-mounted display as an example of the embodiment of the present invention.

In the abovementioned embodiment, the description has been made by citing an example of a case in which the user holds the casing in hands. However, the present invention is not restricted to this case. For instance, the present invention is also applicable widely to a mobile apparatus which the user carries by wearing on body, for example carrying on back (shoulder), or wearing on head. For example, as shown in FIG. 11, the present invention is applicable to a head-mounted display 230 of a spectacle type. The head-mounted display 230 includes a display section 231 which is arranged at a position corresponding to a lens portion of spectacles, and which covers an eye/eyes of the user when the user wears the head-mounted display 230, and two frame-rod sections 232 which are extended from the display section 231. When the user wears the head-mounted display 230, the two frame-rod sections 232 are extended sandwiching user's side-head portion (temples), and are placed on users ears. Here, a force-sense generating unit 233 similar to the force-sense generating unit 4 described above is incorporated in each of the two frame-rod sections 232. Moreover, the head-mounted display 230 includes a motion detection sensor 234 which detects a movement of the head of the user wearing the head-mounted display 230, and a wearing detecting mechanism 235 which detects whether or not the user has worn the head-mounted display 230. As it has been described above, as the movement detecting sensor 234, it is possible to use an acceleration sensor, and as the wearing detecting mechanism 235, it is possible to use a sensor such as a pressure sensor and a touch sensor.

Here, as a novel information providing service, an information providing service which provides recommended information from a nearest store which is near from a current position of the user, to the user who carries a navigation apparatus which includes a GPS mechanism and a gyro mechanism, and a wireless communication apparatus having a mail receiving and sending function are being put to practical use. For instance, when the user passes in front of a certain store, let us assume that recommended information such as bargain-sale information from that store which is at a right side of the user is provided. At this time, a message saying that, the recommended information from the store at the right side of the user has been received is displayed on the display section 231 of the head-mounted display 230. Furthermore, at the same time, a force-sense which turns the user to right is imparted to the user. Concretely, The force-sense generating unit 233 which is arranged in the frame-rod portion 232 sitting on the right ear of the user is driven such that, a force-sense of a translational force in a direction opposite to the display section 231 in the direction of extension of the frame-rod portion 232 is imparted to the user. At the same time, the force-sense generating unit 233 which is arranged in the frame-rod portion 232 sitting on the left ear of the user is driven such that, a force-sense of a translational force directed toward the display portion in the direction of extension of the frame-rod portion 232 is imparted to the user. In this manner, by driving the force-sense generating units 233 provided in the left and right frame-rod portions 232 to impart the force-sense in opposite directions, it is possible to impart the force-sense for turning, to the user wearing the head-mounted display 230.

In this manner, the user who has learned that the recommended information from the store on the right side has been received, when desires to know details of the information received, may turn to right side (input operation of YES) following the force-sense for turning to right which the head-mounted display 230 imparts to the user. Moreover, when the detail information is unnecessary, the user may turn to left side (input operation of NO) countering to the force-sense of the turning force toward right. Such movement of the head of the user is detected by the movement detecting sensor 34, and it is possible to detect which one of the input operations of YES and NO user has been carried out.

As it has been described above, in the embodiment, the input operation is induced to the user by operating the force-sense generating unit, and the user is capable of carrying out the input operation by imparting a motion to the casing 22 according to the force-sense imparted to the user. Accordingly, an operability of the equipment is improved, and even a user who is not accustomed to handling electronic equipments is capable of operating easily.

The present invention shows an action and effect that it is possible to make user carry out the input operation intuitively, and is not restricted to the mobile telephone described above. The present invention is applicable favorably to an electronic equipment which the user can carry such as, a mobile ink jet printer, a cordless handset of a fixed-line telephone (a landline telephone), a digital still camera, a digital video camera, a mobile game console, a mobile music player, an operating device of a stationary game console, and a remote controller of a television.

What is claimed is:

1. A head-mounted display comprising:
   a display section which is configured to cover an eye of the user and which is configured to display an image;
   two frame-rod sections which are extended in a predetermined direction from the display section and which are arranged to sandwich temples of the user;
   two force-sense generating mechanisms each of which is arranged in the one of the two frame-rod sections to generate a force sense parallel to the predetermined direction, respectively;
   a motion sensor which is configured to detect a motion imparted by the user while the two force-sense generating mechanisms impart the force-sense to the user or after the two force-sense generating mechanisms have imparted the force-sense to the user;
a receiver which is configured to receive information from a point which is near from a current position of the user; and
a controller which is configured to control the two force-sense generating mechanisms, and which is configured to recognize an input operation by the user, based on the motion detected by the motion sensor;
wherein the controller is configured to:
  recognize a position of the point relative to the current position of the user, based on the information received by the receiver; and
  control the force-sense generating mechanisms to generate the force-sense of turning toward the position of the point;
wherein, in a state that the motion sensor detects a translational motion imparted by the user, the translational motion which is the same as the force-sense generated by the two force-sense generating mechanisms, while the two force-sense generating mechanisms impart the force-sense to the user or after the two force-sense generating mechanisms have imparted the force-sense to the user, the controller is configured to recognize the motion as an operation of inputting YES; and
wherein, in a state that the motion sensor detects a translational motion imparted by the user, the translational motion which is different from the force-sense generated by the two force-sense generating mechanisms, while the two force-sense generating mechanisms impart the force-sense to the user or after the two force-sense generating mechanisms have imparted the force-sense to the user, the controller is configured to recognize the motion as an operation of inputting NO.

2. The head-mounted display according to claim 1;
wherein each of the two force-sense generating mechanisms includes a weight which is reciprocatable in the predetermined direction, and each of the two force-sense generating mechanisms generates in the weight a positive acceleration directed to one side of the predetermined direction and a negative acceleration directed to the other side of the predetermined direction by making the weight reciprocate to impart to the user a pseudo force-sense of a translational force in one side of or the other side of the predetermined direction.

3. The head-mounted display according to claim 1;
wherein the controller is configured to stop an operation of one of the two force-sense generating mechanisms under a condition that the motion sensor detects the motion within a predetermined time after starting an operation of imparting the force-sense by the one of the two force-sense generating mechanisms, and under a condition that the predetermined time is elapsed, without the motion sensor detecting the motion, after the one of the two force-sense generating mechanisms has started the operation.

4. The head-mounted display according to claim 1;
wherein the motion sensor detects a motion imparted to the casing by the user while at least one of the force-sense generating mechanisms carries out an operation of imparting the force-sense and during a period of time until a certain time has elapsed after the operation has stopped.

5. The head-mounted display according to claim 1, further comprising:
  a sensor which detects whether or not the head-mounted display is worn by the user.

6. The head-mounted display according to claim 1;
wherein the two frame-rod sections are extended from the display toward one side of a predetermined direction;
wherein the two force-sense generating mechanisms include:
  a first force-sense generating unit which is configured to generate a predetermined force directed to one side of the predetermined direction or an opposite force directed to the other side of the predetermined direction, and which is arranged at a right temple of the user in a state that the user wears the head-mounted display; and
  a second force-sense generating unite which is configured to generate the predetermined force or the opposite force, and which is arranged at a left temple of the user in a state that the user wears the head-mounted display;
wherein, in a state that the controller recognize the position as right side of the user while the user wears the head-mounted display, the controller is configured to control the first-sense generating unit to generate the predetermined force and to control the second force-sense generating unit to generate the opposite force such that the two force-sense generating mechanisms generate the force-sense of turning toward right; and
where, in a state that the controller recognizes the position as left side of the user while the user wears the head-mounted display, the controller is configured to control the first-sense generating unit to generate the predetermined force and to control the second force-sense generating unit to generate the opposite force such that the two force-sense generating mechanisms generate the force-sense of turning toward left.

7. The head-mounted display according to claim 6;
wherein, in a state that the two force-sense generating mechanisms generate the force-sense of a turning toward right, and the motion sensor detects the translational motion toward as substantially the same as the turning toward right, the controller is configured to recognize the motion as an operation of inputting YES;
wherein, in a state that the two force-sense generating mechanisms generate the force-sense of the turning toward right, and the motion sensor detects the translational motion toward as substantially the same as the turning toward left, the controller is configured to recognize the motion as an operation of inputting NO;
wherein, in a state that the two force-sense generating mechanisms generate the force-sense of a turning toward left, and the motion sensor detects the translational motion toward as substantially the same as the turning toward left, the controller is configured to recognize the motion as an operation of inputting YES;
wherein, in a state that the two force-sense generating mechanisms generate the force-sense of the turning toward left, and the motion sensor detects the translational motion toward as substantially the same as the turning toward right, the controller is configured to recognize the motion as an operation of inputting NO.

* * * * *